L. G. BAYRER.
VARIABLE SPEED POWER TRANSMISSION.
APPLICATION FILED JAN. 28, 1909.

932,843.

Patented Aug. 31, 1909.

L. G. BAYRER.
VARIABLE SPEED POWER TRANSMISSION.
APPLICATION FILED JAN. 28, 1909.
932,843.
Patented Aug. 31, 1909.
6 SHEETS—SHEET 2.
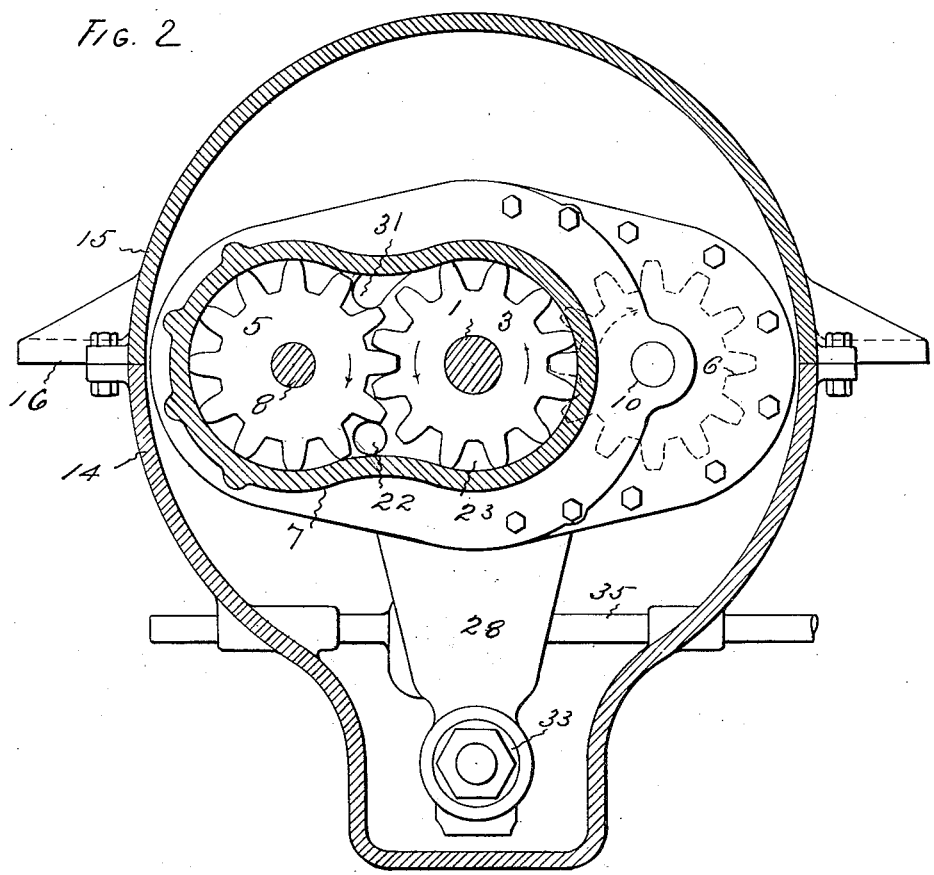
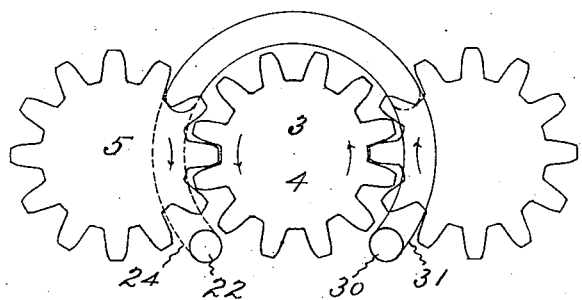

L. G. BAYRER.
VARIABLE SPEED POWER TRANSMISSION.
APPLICATION FILED JAN. 28, 1909.

932,843.

Patented Aug. 31, 1909.
6 SHEETS—SHEET 3.

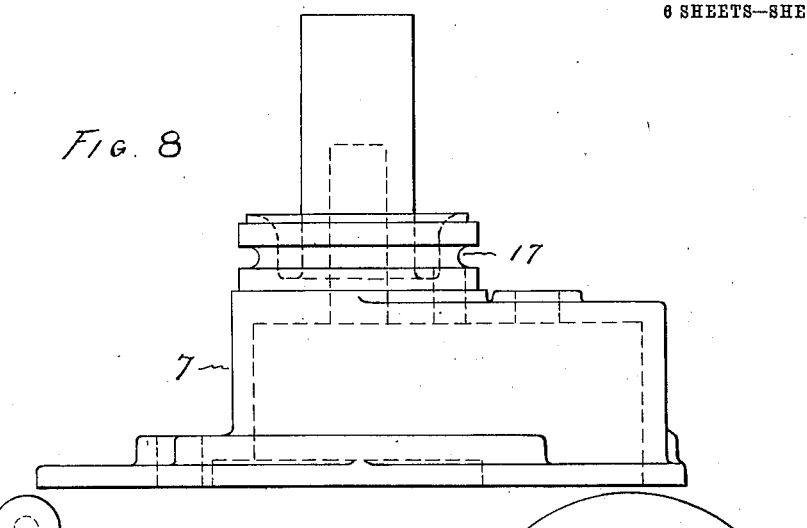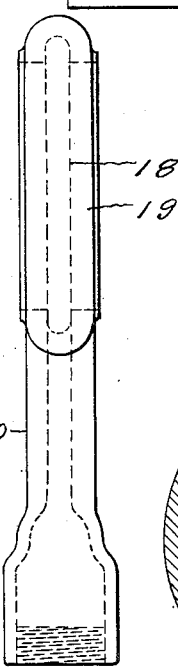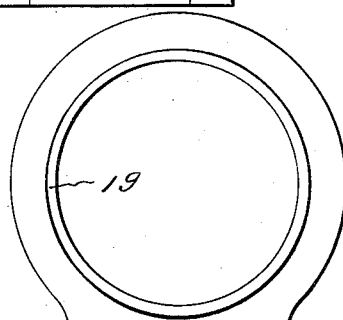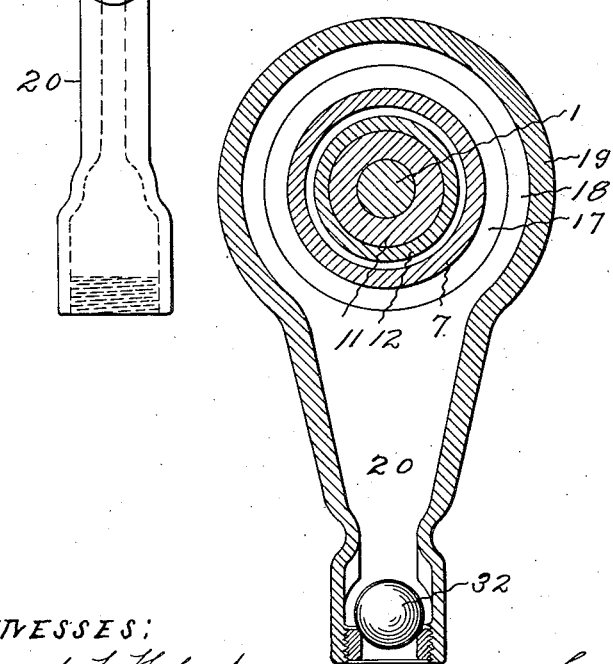

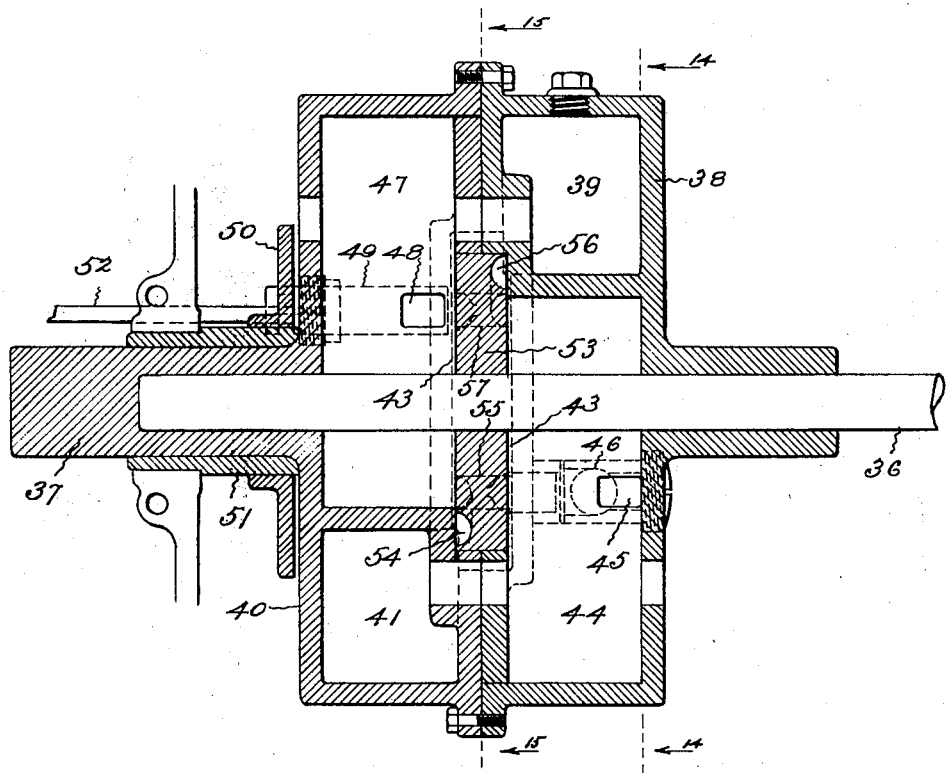
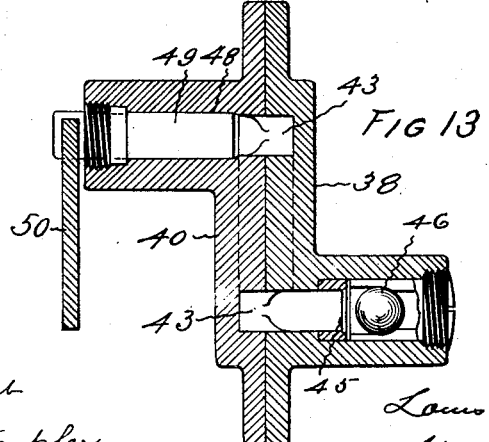

L. G. BAYRER.
VARIABLE SPEED POWER TRANSMISSION.
APPLICATION FILED JAN. 28, 1909.

932,843.

Patented Aug. 31, 1909.
6 SHEETS—SHEET 6.

WITNESSES:

INVENTOR:

UNITED STATES PATENT OFFICE.

LOUIS GARFIELD BAYRER, OF HARTFORD, CONNECTICUT.

VARIABLE-SPEED POWER TRANSMISSION.

932,843.  Specification of Letters Patent.  Patented Aug. 31, 1909.

Application filed January 28, 1909. Serial No. 474,802.

*To all whom it may concern:*

Be it known that I, LOUIS GARFIELD BAYRER, a citizen of the United States, residing at Hartford, in the county of Hartford and State of Connecticut, have invented a new and useful Variable-Speed Power Transmission, of which the following is a specification.

This invention relates to a mechanism which is designed to be interposed between any driving shaft and a driven shaft in alinement therewith, in a shop or in a vehicle, for the purpose of causing one shaft to rotate the other, which mechanism utilizes a liquid, such as oil, for the purpose of clutching the parts.

The object of this invention is to provide a simple, cheap and powerful mechanism, which can be arranged between sections of any driving shaft or counter shaft in a mill, factory or machine shop, or between an engine shaft and the transmission shaft of an automobile or power driven boat, the clutching action of which mechanism, and consequently the relative speed of rotation of the driven shaft with relation to the rotation of the driving shaft, is effected by controlling the flow of liquid through the mechanism. In accomplishing this object, one shaft or section of a shaft is connected with one member of a rotary pump, while the other shaft or section of a shaft is connected with the other member of the rotary pump, and the two members of the pump are clutched, or have their speeds of rotation regulated with relation to each other, to an extent that depends upon the amount of liquid which the pump is permitted to circulate through the mechanism.

Figure 1:
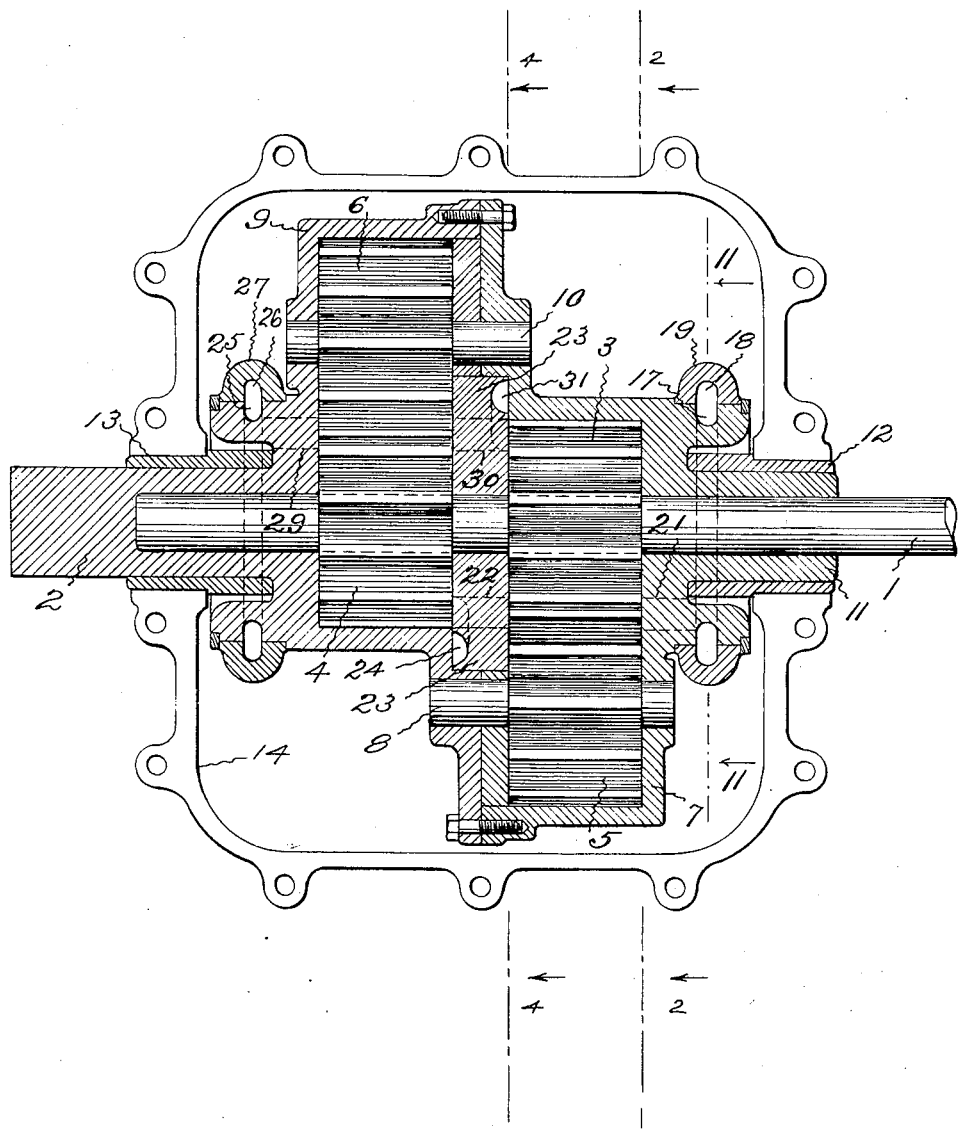
Figure 4:
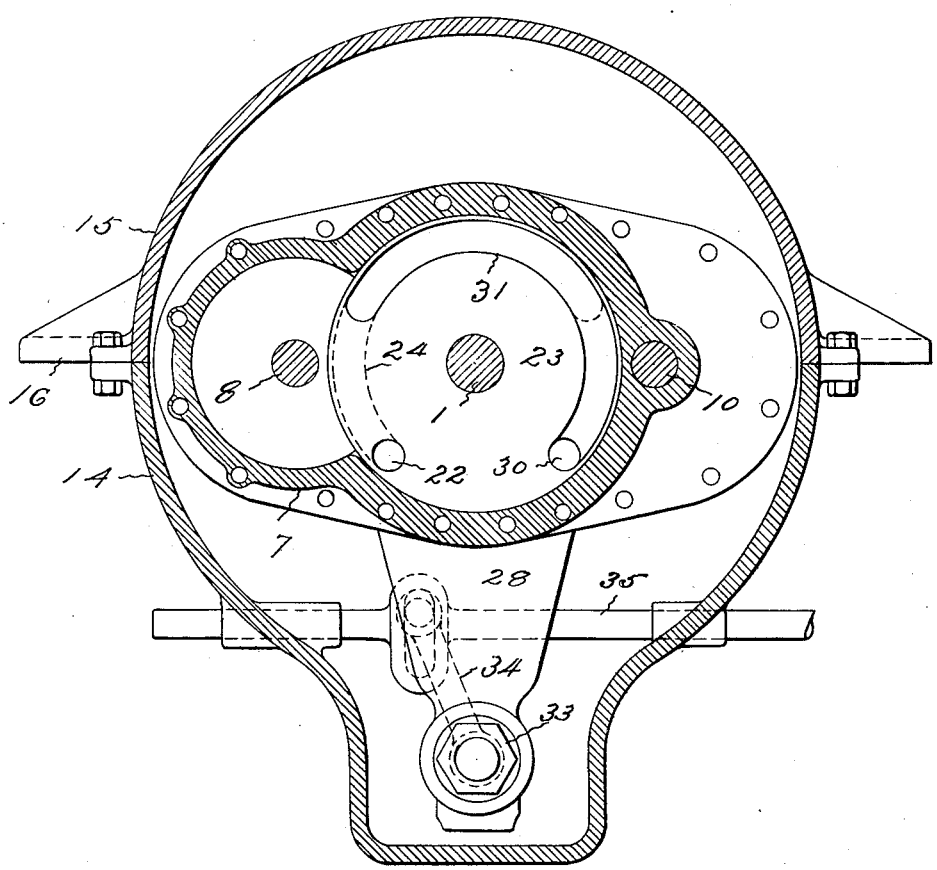
Figure 5:
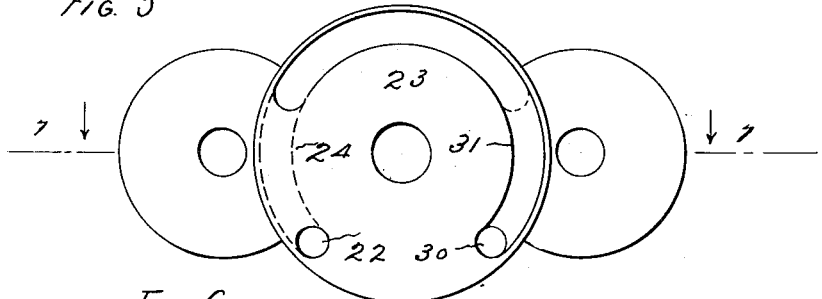
Figure 6:
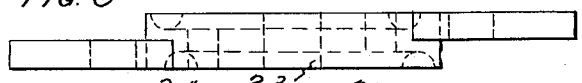
Figure 7:
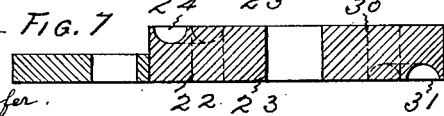
Figure 14:
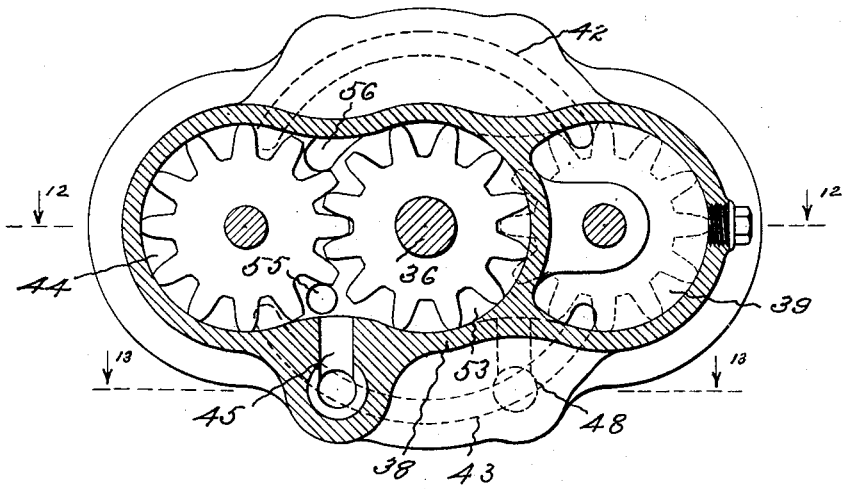
Figure 15:
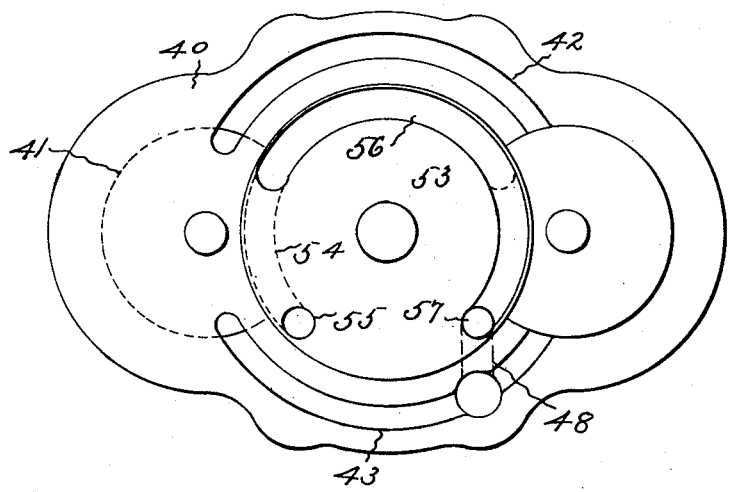

Figure 1 of the accompanying drawings shows a horizontal section of a variable speed power transmission mechanism which embodies this invention. Fig. 2 shows a transverse section taken on the plane indicated by the dotted line 2—2 on Fig. 1. Fig. 3 shows a diagrammatic view of the pump gears and ports of the mechanism shown in Figs. 1 and 2. Fig. 4 shows a transverse section on the plane indicated by the dotted line 4—4 on Fig. 1. Fig. 5 shows a diagrammatic view of the plates containing the ports and liquid passages which are arranged between the pump gears of the form of mechanism illustrated. Fig. 6 shows a top view of the plates shown in Fig. 5. Fig. 7 shows a horizontal section of these plates, taken on the plane indicated by the dotted line 7—7 on Fig. 5. Fig. 8 shows a plan of one section of the pump case—both sections being substantially the same in form. Fig. 9 shows an edge view, and Fig. 10 shows a face view of the fitting, that in the form of pump first shown, is arranged on the hub of the pump case to provide the liquid passage from the reservoir to the ports. Fig. 11 shows a vertical section through the fitting and hub of the pump case, on the plane indicated by the dotted line 11—11 on Fig. 1. Fig. 12 shows a horizontal section of a modified form of the mechanism, with the gears omitted, on the plane indicated by the dotted line 12—12 on Fig. 14. Fig. 13 shows a horizontal section of the lower part of the modified mechanism, on the plane indicated by the dotted line 13—13 on Fig. 14. Fig. 14 shows a vertical section on the plane indicated by the dotted line 14—14 on Fig. 12, and Fig. 15 shows a vertical section on the plane indicated by the dotted line 15—15 on Fig. 12.

In the form of the invention illustrated, a double rotary pump of the geared type is employed, and the pump gears are so arranged as to balance the weight of the parts. In some cases it is desirable to employ a single pump, in some two pumps, and in others more than two pumps. Throughout the specification the double balance form of gear pump is described as illustrating both single and multiple arrangements, although the invention is not limited to a mechanism having two pumps, nor to pistons of gear form, nor to the balanced arrangement, for the apparatus is useful and efficient with a single pump, although it is not as desirable, on account of the unequal distribution of the weight of the parts.

For the purpose of explanation, the shaft 1 may be assumed to be the driving or motor shaft. The end of this shaft is shown as extending into a recess in the hub 2, which is designed to be connected with the driven or transmission shaft. Of course this arrangement could be reversed, if desired, that is, the hub 2 could be connected with the driving or motor shaft, and the shaft 1 be the driven or transmission shaft.

Keyed on the shaft 1 of the mechanism illustrated, is a rotary pump member 3 and a rotary pump member 4, these members being in the form of gears. The gear 3 meshes with a gear 5 and the gear 4 meshes with a gear 6. The gear 5, which is located in the case section 7, is mounted on the arbor 8, held by the walls of the case, while the gear 6, which is located in the opposing case section 9, on the other side of the shaft, is mounted on an arbor 10, held by the walls of the case. The hub 11 of the case section 7 is borne by a bushing 12 that is mounted in the shell, and the hub 2 of the case section 9 is borne by the bushing 13 mounted in the shell. This shell is desirably formed of the lower section 14 and the upper section 15, which sections are bolted together at the middle of the shell, and the upper section has flanges 16, by means of which the device may be supported.

If the pump gears are unrestricted when the shaft 1 is driven, the gear 3 will rotate the gear 5, and the gear 4 will rotate the gear 6 freely, without transmitting any motion to the hub 2, or to the driven or transmission shaft. If the pump gears are restricted and prevented from rotating when the shaft 1 is driven, the gear 3 becomes locked more or less firmly with the gear 5, and the gear 4 becomes locked more or less firmly with the gear 6, depending on the amount of restriction, and then under this condition the case surrounding the gears is revolved, and through its hub 2, drives the driven or transmission shaft. When the gears are locked solidly, the parts are so clutched that the driven or transmission shaft will be driven with the same power and speed as the motor or driving shaft. When the restriction is limited, the driven or transmission shaft will be rotated at a speed with respect to the motor or driving shaft, depending upon the amount of restriction of rotation of the pump gears. This restriction or obstruction is effected by the amount of liquid which is allowed to be pumped through the mechanism by the pump gears.

The shell is filled with liquid, preferably oil. In the exterior of the hub of the case section 7 is a groove 17 and surrounding this and having a corresponding groove 18 is a collar 19 with a downwardly projecting bib 20 that opens at the bottom near the bottom of the shell. From the groove 17 a port 21, Fig. 1, opens through the case section 7 to the interior below the pump gears 3 and 5. A port 22, Fig. 1, in line with the port 21, opens through the plate 23 that is located in a recess formed between the case sections 7 and 9. This plate in one face, has a groove 24 that extends from the port 22 up and around to above the gears 4 and 6. By means of these passages, ports and this groove, liquid from the shell enters the case below the gears 3 and 5 and above the gears 4 and 6 so that it may be pumped through the mechanism by the rotation of these gears.

The hub of the gear case section 9 is provided with an exterior groove 25, and surrounding this hub and having a corresponding groove 26, is a collar 27 that has a downwardly projecting bib 28, which opens at its lower end near the bottom of the shell. Opening through the case into the groove 25 from below the gears 4 and 6 is a port 29, Fig. 1. Directly opposite this port in the central plate 23 is a port 30. This port opens into a groove 31 that extends in one face of the plate from the port 30 below the gears 4 and 6 to the space above the gears 3 and 5. These passages, ports and this groove when unrestricted, permit liquid that is pumped, to flow from above the gears 3 and 5 and below the gears 4 and 6 out through the bib 28 into the shell.

Assuming that the bib 20 is the inlet, that bib may be provided at its lower end with an inwardly opening ball valve 32, and assuming that the bib 28 is the outlet, the lower end of that bib may be provided with a cock 33. The plug of this cock may have a lever 34 that is adapted to be turned, by the reciprocation of a rod 35 that extends to the outside of the shell, and can be connected with an operating or shifting lever of any character, located within convenient reach of the operative, driver or engineer.

When the cock 33 is wide open and the shaft 1 is driven by a motor or by another shaft, or by a pulley and belt, the rotation of the pump gears draws liquid inwardly through the bib 20 and through the port 21 to below the gears 3 and 5, and through the port 22 and groove 24 to above the gears 4 and 6. This liquid is then pumped freely by the gears 3 and 5 through the groove 31 and port 30 to below the gears 4 and 6, and pumped by the gears 4 and 6 from above to below, and out through the port 29 and bib 28 into the shell. When the liquid flows freely in this manner, the gears merely rotate on their axes, and the gear case and driven or transmission shaft remain stationary. If the cock 33 is shut so that no liquid can flow past it, and out through the bib 28 into the shell, the pumping action of the gears is prevented. Under these circumstances gears are locked so that they cannot rotate on their axes, but will cause the gear case to revolve and thus drive the driven or transmission shaft with a speed and power equal to the speed and power of the rotation of the motor or driving shaft. Should the cock 33 be partly opened, the pumping action of the gears would be partly restricted, and the driven or transmission shaft would be rotated with a speed proportional to the amount of liquid that could be pumped by the gears through the partly open cock. In other words, the speed of the driven or transmission shaft depends upon the amount the cock is opened.

In the form of the invention above described the liquid is contained in the shell surrounding the gear case and is sucked from the shell through the inlet bib, and after passing through the mechanism is forced back into the shell through the outlet bib. In the modified form of the invention shown in Figs. 12 to 15, the liquid reservoir is formed a part of and revolves with the gear case, with which construction it is unnecessary to have a shell surrounding the gear case. In this form, let it be assumed that the shaft 36 is the driving shaft and has gears fixed thereon, which gears mesh with other gears (Fig. 14), the same as in the previous case, and that the hub 37 is connected with the driven or transmission shaft, although of course, as in the previous case, the hub 37 could be connected with the driving shaft and the shaft 36 could be the driven shaft. The gear case section 38 is built out so as to provide an oil reservoir 39, and the gear case section 40 is similarly built out so as to provide an oil reservoir 41. These reservoirs are connected above by a groove 42 and below by a groove 43 made in the faces of the case sections in such manner that the two reservoirs, although in opposite sections of the case, and on opposite sides of the shaft, for the purpose of balancing the weight, are united and become practically one reservoir for the liquid. Opening from the lower groove 43 in the face of the case, into the gear chamber 44 is an inlet port 45 and in this port is desirably placed an inwardly opening ball valve 46. Opening from the same groove between the faces of the gear case sections into the gear chamber 47 is an outlet port 48. This port is controlled by a slide valve 49, the stem of which extends through the side of the case and is engaged and adapted to be moved in and out, by a disk 50 which can be moved on the sleeve 51 by a rod 52, or any other suitable means. When the valve 49 is drawn out, the outlet port 48 is opened, and when that valve is pushed in that port is closed. Of course the port may be opened more or less by moving the valve to any intermediate position. Between the faces of the case sections in this form, as in the form previously described, is a circular plate 53 which, in one face, has a groove 54 that extends from a port 55 below the first two gears, to a position above the second two gears. This plate also has a groove 56 that extends from the port 57 below the second two gears to a position above the first two gears. When the valve 49 opens the port 48, the rotation of the shaft 36 causes the gears to draw liquid from the reservoirs through the port 45 below the first set of gears, and through the port 55 and groove 54, above the second set of gears, and then the first set of gears will pump the liquid from below to above them, and through the groove 56 and port 57 to below the second set of gears, while the second set of gears will pump liquid which they receive from the groove 54 above them, around their peripheries and below them, which liquid will flow back through the port 48 into the reservoirs. With the outlet port wide open and the circulation of liquid free, the gears will merely turn on their axes, and the driven shaft will not be rotated. If the port 48 is shut, liquid cannot circulate and the pump gears become locked together. Then the rotation of the driving shaft through the locked gears revolves the case and drives the driven shaft. The speed of rotation of the case and driven shaft with respect to the speed of rotation of the driving shaft depends upon the amount of opening of the port 48 and the amount of restriction of the flow of liquid through that port.

The invention claimed is:

1. A variable speed power transmission mechanism having a rotary pump case, a shaft extending into the case, a pair of gears mounted on said shaft in the case, intermeshing gears in the case and carried by the case on opposite sides of the shaft, a liquid reservoir, inlet passages from the liquid reservoir through the case to the inlet sides of the gears, outlet passages through the case from the outlet side of the gears to the liquid reservoir, and means for controlling the flow of fluid through the passages.

2. A variable speed power transmission mechanism having a rotary pump case, a shaft extending into said case, a rotary pump member mounted on said shaft in the case, a complementary pump member mounted in the case and carried thereby on one side of the pump member that is mounted on the shaft, a liquid reservoir chamber formed in the case on the opposite side of the shaft from the pump member carried by the case, and counterbalancing the weight of said pump member, an inlet passage from the reservoir chamber to the pump chamber, an outlet passage from the pump chamber to the reservoir chamber, and means for controlling the flow of liquid through the pump chamber.

3. A variable speed power transmission mechanism having a rotary pump case, a shaft extending into said case, a gear mounted on said shaft in the case, a gear mounted in the case and carried thereby and intermeshing with the gear that is mounted on the shaft, a liquid reservoir chamber formed in the case on the opposite side of the shaft from the gear carried by the case and counterbalancing the weight of said gear, an inlet passage from the reservoir chamber to the pump chamber, an outlet passage from the pump chamber to the reservoir chamber, and means for controlling the flow of liquid through the pump chamber.

4. A variable speed power transmission mechanism having a rotary pump case, a shaft extending into the case, a pair of gears mounted on said shaft in the case, intermeshing gears in the case and carried thereby on opposite sides of the shaft, a liquid reservoir chamber formed in the case on the opposite side of the shaft from each gear that is carried by the case, and counterbalancing the weight of said gears, inlet passages from the reservoir chambers to the gear chambers, outlet passages from the gear chambers to the reservoir chambers, and means for controlling the flow of liquid from the reservoir chambers through the gear chambers and into the reservoir chambers.

LOUIS GARFIELD BAYRER.

Witnesses:
HARRY R. WILLIAMS,
JOSEPHINE M. STREMPFER.